US008504917B2

(12) United States Patent (10) Patent No.: US 8,504,917 B2
Clarke-Martin et al. (45) Date of Patent: Aug. 6, 2013

(54) METHOD AND SYSTEM FOR DISPLAYING CONTEXTUAL ADVERTISEMENTS WITH MEDIA

(75) Inventors: Steven Clarke-Martin, West Hollywood, CA (US); Chris Kalaboukis, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/486,296

(22) Filed: Jun. 1, 2012

(65) Prior Publication Data

US 2012/0239496 A1 Sep. 20, 2012

Related U.S. Application Data

(63) Continuation of application No. 12/772,522, filed on May 3, 2010, now Pat. No. 8,219,911, which is a continuation of application No. 11/697,615, filed on Apr. 6, 2007, now Pat. No. 7,739,596.

(51) Int. Cl.
*G06F 3/00* (2006.01)
*G06F 3/14* (2006.01)

(52) U.S. Cl.
USPC ............ 715/716; 715/765; 707/705; 707/805

(58) Field of Classification Search
USPC ................. 715/716, 719, 733, 738, 764, 765, 715/781; 707/705, 805
See application file for complete search history.

(56) References Cited

U.S. PATENT DOCUMENTS

| 7,685,210 | B2 * | 3/2010 | Plastina et al. ................ 707/805 |
| 2003/0001880 | A1 * | 1/2003 | Holtz et al. ................... 345/716 |
| 2005/0081155 | A1 * | 4/2005 | Martin et al. ................. 715/719 |
| 2005/0149880 | A1 * | 7/2005 | Postrel .......................... 715/808 |
| 2006/0010111 | A1 * | 1/2006 | Jones et al. ....................... 707/3 |
| 2007/0204310 | A1 * | 8/2007 | Hua et al. ......................... 725/88 |

* cited by examiner

*Primary Examiner* — Xiomar L Bautista
(74) *Attorney, Agent, or Firm* — Berkeley Law & Technology Group, LLP (57) ABSTRACT

Systems and methods have been developed for displaying contextually relevant advertisements to users as media objects are being rendered. One or more data sources with contextual information for different portions of each media object are maintained. From this contextual information, keywords may be generated and used to locate contextually-related advertisements. The advertisements are selected based on contextual information about the media object in order to match or otherwise be contextually relevant with the media content being rendered. As the subject matter of the media object changes during rendering, different advertisements related to the new context are provided that replace the prior advertisement. The advertisements are displayed in an area that could be used for other purposes when the rendering device is not rendering media objects.

31 Claims, 5 Drawing Sheets

METHOD AND SYSTEM FOR DISPLAYING CONTEXTUAL ADVERTISEMENTS WITH MEDIA

CROSS REFERENCE TO RELATED APPLICATIONS

This application claims priority from co-pending U.S. patent application Ser. No. 12/772,522 filed May 3, 2010, entitled METHOD AND SYSTEM FOR DISPLAYING CONTEXTUAL ADVERTISEMENTS WITH MEDIA, and U.S. patent application Ser. No. 11/697,615 filed Apr. 6, 2007, now U.S. Pat. No. 7,739,596, entitled METHOD AND SYSTEM FOR DISPLAYING CONTEXTUAL ADVERTISEMENTS WITH MEDIA, which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The internet and other networks are now commonly used to deliver media objects (video files, streaming media data, music/audio files, image files, etc.) to end-user consumers. Typically, a consumer accesses such media by sending a request (typically via a browser program on the consumer's client computer) to a media server. In response, the media server retrieves the media data and transmits it to the consumer's computer, where it is rendered (such as by a media player) to the consumer.

Many media server operators are either entirely funded or obtain supplemental income through the display of advertisements to consumers in conjunction with the serving of media. Thus it is important to the operators to maximize the delivery of advertisements to the consumers where possible.

There are many current instances where while a media object is playing no advertisements are being displayed. For example, while a user is playing a song with a media player nothing may be changing visually other than the slider moving to the right as the song is played. Another example is playing a streaming video from most video web sites. In this example, the video is rendered (i.e., plays) but no advertising is displayed beside the video as it plays, other than the initial graphic or text which is displayed when the video is initially loaded. The advertisements do not change over the course of the video.

SUMMARY

Against this backdrop systems and methods have been developed for displaying contextually relevant advertisements to users as media objects are being rendered. The advertisements are selected based on contextual information about the media object in order to match or otherwise be contextually relevant with the media content being rendered. As the subject matter of the media object changes during rendering, different advertisements related to the new context are provided that replace the prior advertisement. The advertisements are displayed in an area that could be used for other purposes when the rendering device is not rendering media objects.

In one aspect, the disclosure describes a method for selecting an advertisement for display to a user of a device. The method includes receiving a request from a media module on the device, in which the request identifies a media file. A first portion of the media file is then streamed to the media module on the device. In addition, a first set of one or more keywords associated with the first portion of the media file is generated. Based on the first set of one or more keywords associated with the first portion, a first advertisement is selected. The method further includes transmitting the first advertisement and first information associating the first advertisement with the first portion of the media file to the media module on the device for display to the user.

In another aspect, the disclosure describes a system for rendering media and displaying advertisements to a user. The system includes a media module that retrieves a requested media file from a media file database and streams the requested media file to a requesting device, in which the requested media file is requested by the requesting device. The system also includes an advertisement selection module that accesses at least one data source containing contextual information describing portions of the requested media file. The advertisement selection module also selects a different advertisement for each of at least two different portions of the requested media file based on the contextual information describing the at least two different portions, and transmits the different advertisements to the requesting device. The system further may include the requesting device that receives the media file and the at least two different advertisements and renders the media file, wherein, while rendering each of the at least two different portions, the requesting device displays the different advertisement for the respective different portion being rendered.

In another aspect, the disclosure describes a method of displaying advertisements on a media player. The method includes requesting, in response to a user input received via a graphical user interface on the media player, an audio stream. The audio stream is received, in which the audio stream includes a first portion associated with a first keyword followed by a second portion associated with a second keyword. The audio stream is rendered and while rendering the first portion, the method includes displaying, on the graphical user interface, a first advertisement associated with the first keyword. In addition, the method includes while rendering the second portion, replacing, on the graphical user interface, the first advertisement with a second advertisement associated with the second keyword.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

The systems and methods herein can add an advertisement or ad placement element to any streaming media content (e.g., music, movies, and slide shows) which is currently playing on any rendering device, that is a device (such as a computing device) that can receive and render media content from a remote source. The systems display a relevant ad at the opportune moment in time as the content is rendered (i.e., plays) on the device. The systems and methods may be used with media content of any type including audio streams, video streams, interactive applications or any other media content item. Rendering devices include any device from a TV to a PC to a mobile phone to an IPOD.

Figure 1:
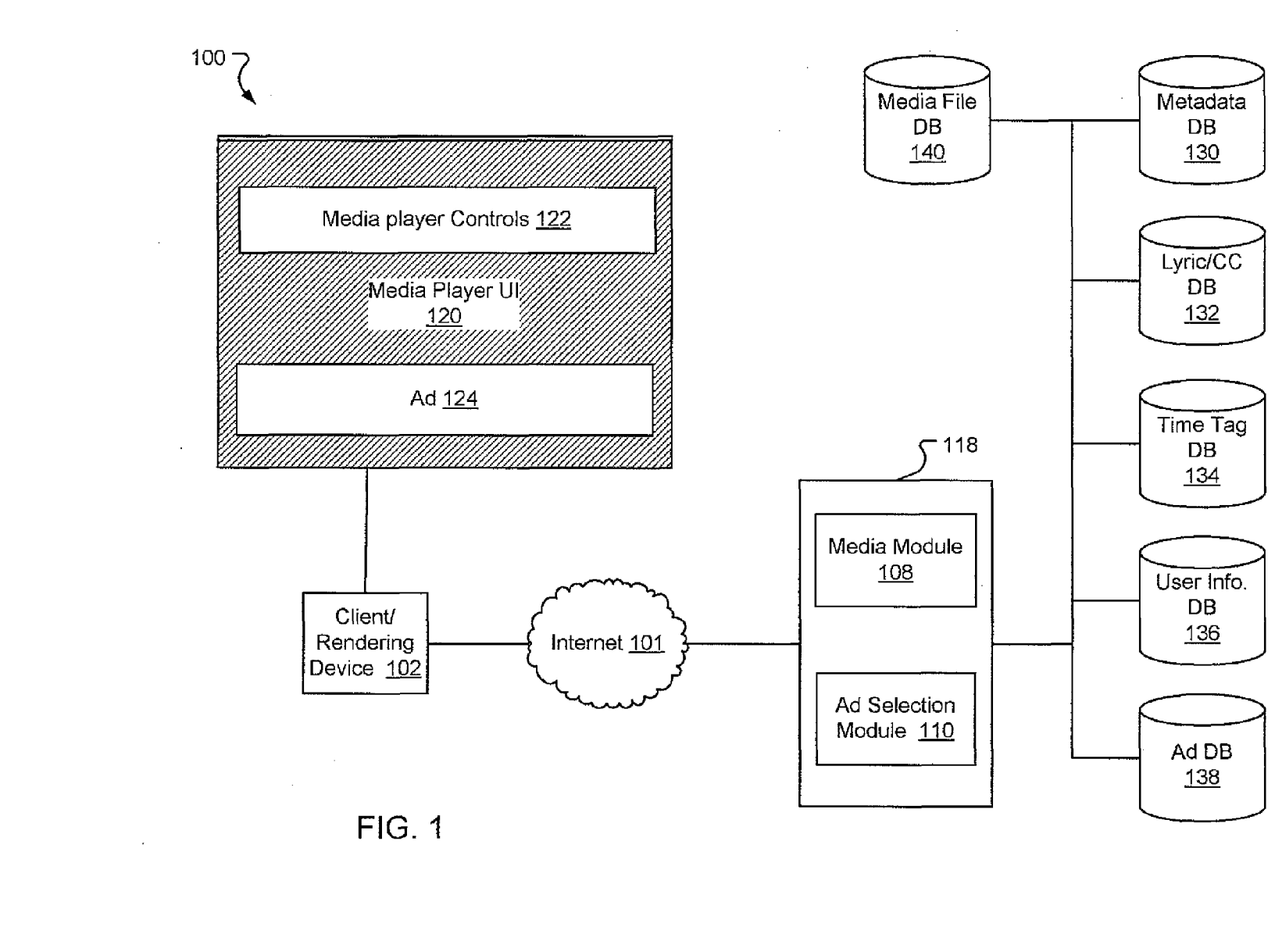
FIG. 1 illustrates an embodiment of an architecture for rendering media with contextual advertisements.

FIG. 1 illustrates an embodiment of an architecture for rendering media with contextual advertisements. The architecture 100 is a computing architecture in which media is rendered by a rendering device 102 onto a display device 121. The architecture 100 illustrated is a networked client/server architecture in which a rendering device (referred to as a "client") issues media requests to a remote computing device (referred to as a "server"), which responds by transmitting the requested media content to the client for rendering to a user. The systems and methods described herein are suitable for use with other architectures as will be discussed in greater detail below.

For the purposes of this disclosure, a computing device such as the client 102 or server 118 includes a processor and memory for storing and executing data and software. Computing devices may be provided with operating systems that allow the execution of software applications in order to manipulate data. In the embodiment shown, the client 102 is a computing device, such as a personal computer (PC), web-enabled personal data assistant (PDA) a smart phone, a media player device such as an IPOD, or a smart TV set top box. The client 102 is connected to the Internet 101 via a wired data connection or wireless connection such as a wi-fi network, a WiMAX (802.16) network, a satellite network or cellular telephone network.

The client 102 includes an application for receiving and rendering media content. Such applications are commonly referred to a media player application. Examples of such applications include WINDOWS MEDIA PLAYER and YAHOO! MUSIC JUKEBOX. The media player application, when executed, generates a graphical user interface (GUI) 120 on a display 121 attached to or part of the computing device 102. The GUI 120 includes a set of user-selectable controls 122 through which the user of the client device 102 can interact to control the rendering of the media content. For example, the GUI 120 may include button control for each of the play-pause-rewind-fast forward commands commonly associated with the rendering of media on rendering devices. By selection of these controls, the user may cause the client 102 to obtain and render media content from local storage or from the media server 118 and control the rendering of the media to the user.

The GUI 120 further includes at least one area 124 that may be used for displaying advertisements when the client is rendering media content to the user. If the media player is rendering an audio stream or audio object, such as a song, the area 124 may be the area set aside for showing video content. Alternatively, the area 124 may be an area normally used to display other information, such as navigation or search information, to the user when the media player is not rendering media. This allows the GUI 120 to be sequentially showing different advertisements to the user while the media player is rendering media, particularly audio.

The architecture 100 also includes server 118, which may be a single server or a group of servers acting together. A number of program modules and data files may be stored in a mass storage device and RAM of the server 118, including an operating system suitable for controlling the operation of a networked server computer, such as the WINDOWS XP or WINDOWS 2003 operating systems from MICROSOFT CORPORATION.

Local data structures, including discrete media objects such as media files, may be stored on a mass storage device (not shown) that is connected to or part of any of the computing devices described herein including the client 102 or a server 118. The mass storage device includes some form of computer-readable media and provides non-volatile storage of data for later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In the architecture 100 shown, a client 102 is connected to a server 118 via a network, such as the Internet 101 as shown. The client 102 is adapted to issue requests to the server computer 118 for media content. In response, the server computer 118 retrieves or otherwise accesses the requested media content and transmits the content back to the requesting client 102. The requested media content may be stored as a discrete media object (e.g., a media file containing renderable media data that conforms to some known data format) that is accessible to the server 118. In the embodiment shown, a media file database 140 is provided that stores various media objects that can be requested by the client 102. In an alternative embodiment, the requested media content may be generated by the server 118 in response to the request.

The client 102, upon receipt of the requested media content, may store the media content for later rendering. Alternatively, the client 102 may render the media content as quickly as practicable while the content is being received in order to reduce the delay between the client request for the content and the initiation of the rendering of the content to the user—a practice referred to as rendering "streaming media." When rendering streaming media, the client 102 may or may not store a local copy of the received media content depending on the system.

In addition to transmitting the requested media content, the server 118 also selects and transmits advertisements to the client 102. In addition, the server 118 identifies the subject matter of different portions of the requested media content. The advertisements are specifically selected to match the context or subject matter of these different portions of the requested media content. These contextually-matching advertisements are then also transmitted to the client 102 so that they can be displayed to the user as their associated portion of the media content is being rendered. Thus, the advertisements displayed to the user will have some relationship with the content being rendered at any given time.

This display of contextually relevant advertisements may be more easily illustrated by an example. In one example, a user may request a song that is streamed to rendering device 102 from the media server 118. As the song is rendered (e.g., played on speakers attached to the rendering device 102), the different portions of the song are played to the user. If, for example, one portion of the song is about "love", a contextually matching advertisement, such as an advertisement for a singles website or for a flower shop, is displayed to the user at the same time that portion of the song is being played.

In the architecture 100 shown, advertisements are selected from an advertisement database 138 by an advertisement selection module 110 based on keywords or other information known about each portion of the media content being transmitted by the server 118. The keywords may be generated by the media module 108, the advertisement selection module 110, by an independent keyword generation module (not shown) or by some other module or application on the server 118.

Advertisements may be selected via various methods. In an embodiment advertisements may be selected based on time tags for the media object. Time tags are metadata that associate keywords, descriptions or other text with specific portions of media content. For example, a set of one or more time tags may be stored for each media object. In an embodiment, an individual time tag may take the form of a time stamp identifying a time measured from the start of the media object (e.g., "1 minute, 10 seconds", "1:10") or other time or portion indicator (e.g., "chapter 1", "from 1 minute, 10 seconds to 3 minutes, 45 seconds", "1:10-3:45") and a set of one or more keywords ("e.g., "love", "John Wayne", "Georgia", "New Orleans", etc.).

In addition, the system can use other sources to identify the context of a particular portion of a media object. For example, lyrics, captions or sub-titles may be used (e.g., when a song or video mentions love—a Yahoo! Personals ad appears). Billboard Magazine genre groupings (if its a hip hop song, could present Fubu or Sean John, if pop-rock present Gap/JCrew ads) or music types (present spa and massage ads for tranquil/ambient music) may be used. Categories may be used such as holiday/time of year based selections (show gift ads during Christmas season or while playing Christmas music) to determine the advertisements to be shown and the time to show the advertisements. For media content that includes video, certain imagery may be used to produce specific advertisements at specific times, for example when a video shows a delivery truck speeding through a scene, an advertisement for FEDEX could be displayed beside the video.

In addition, advertisements for a portion of a media object may be selected from demographic information known about the user or about the average consumer of the particular media object. Such demographic information may be used to generate keywords associated with the demographic, such as codes identifying a particular demographic group (e.g., college age males, women living in New York City), may be obtained and used to select particularly relevant advertisements to be displayed concurrently with a portion of the media object for which the subject matter is not contextually relevant to a advertisement in the advertisement database 138. For example, if it is known that the user of the client 102 has previously made purchases at the GAP, GAP advertisements or GAP coupons could be selected and displayed while the media object plays portions that do not otherwise lend themselves to contextual advertisements.

The architecture 100 includes several elements that may be utilized when selecting advertisements for a particular portion of the media content. FIG. 1 includes a lyric database 132 that includes lyrics, closed caption transcripts or other text associated with different media content. In an embodiment, for each media file containing a song, the lyric database 132 includes a set of lyrics or a file containing the lyrics of the song. The lyrics may further include time stamps or other information to assist in the determination of what lyrics should be associated with different portions of the song. In an embodiment, the server 118 may access the lyric database when a song is requested and search the lyrics for sets of one or more keywords that appear in the different portions of the song. These keywords may then be used to select a contextually relevant advertisement for each portion of the song. Similarly, if the media is a video, the closed captioning may be used to identify sets of keywords to use to select advertisements.

In addition to the lyric database 132, a metadata database 130 may also be provided as described above. The metadata database 130 is a data source from which metadata associated with media objects and associated with portions of media objects may be obtained. The metadata may include keywords or may include advertisement identifiers for different portions of media objects. The metadata may include demographic data identifying one or more demographic groups for which a media object or portion of a media object is particularly popular.

A time tag database 134 may also be provided as shown and discussed above.

A user information database may be provided that stores information, such as demographic information, about the user of the client 102. In an embodiment, the user may be a member of the media service provided by the server 118, and the demographic information is obtained through the membership relationship.

As described above, for each media object rendered by the client 102, several ads could be displayed over the elapsed time of rendering the media object. Optionally, when possible, the system can also scroll lyrics (karaoke style) to encourage screen viewership while music plays.

The system described above allows for different advertisements to be shown depending on the level of service provided to or purchased by the client 102. For example, for a paid music service, advertisements could be suspended. Alternatively, the ads shown to paying subscribers could be coupons, special offers, or other specialized incentives. While freely obtained media player applications or services could show pure advertisements instead value advertisements. This provides an added value to subscribers outside of the value of subscribing to a music service. For example, instead of a generic store ad, as in the previous example, a paying subscriber may get a 20% off coupon at the same store.

FIG. 1 presents one embodiment a client/server architecture. Many other embodiments are also possible, including different client/server embodiments in which various functions are performed by different components or distributed between several components. For example, in an embodiment the client 102 may be rendering media objects stored locally on the client. However, the client 102 may still notify the server 118 of what media object is being played and, in response, the server 118 may transmit contextual advertisements as discussed above so that the user experience is identical to that described above. In yet another embodiment, the advertisement selection module 110 may be located on a independent advertisement server (not shown) from the media server 118. The media server 118 may then transmit requests to the advertisement server for advertisements. These requests may include the keywords to be used for selecting the advertisements or simply an identification of the media object, in which case the ad server will perform the function of generating the keywords for each portion of the media object in addition to the advertisement selection itself Many other combinations and embodiments are also possible in which more or less functions are performed by different devices, while still providing the same experience to the user.

Figure 2:
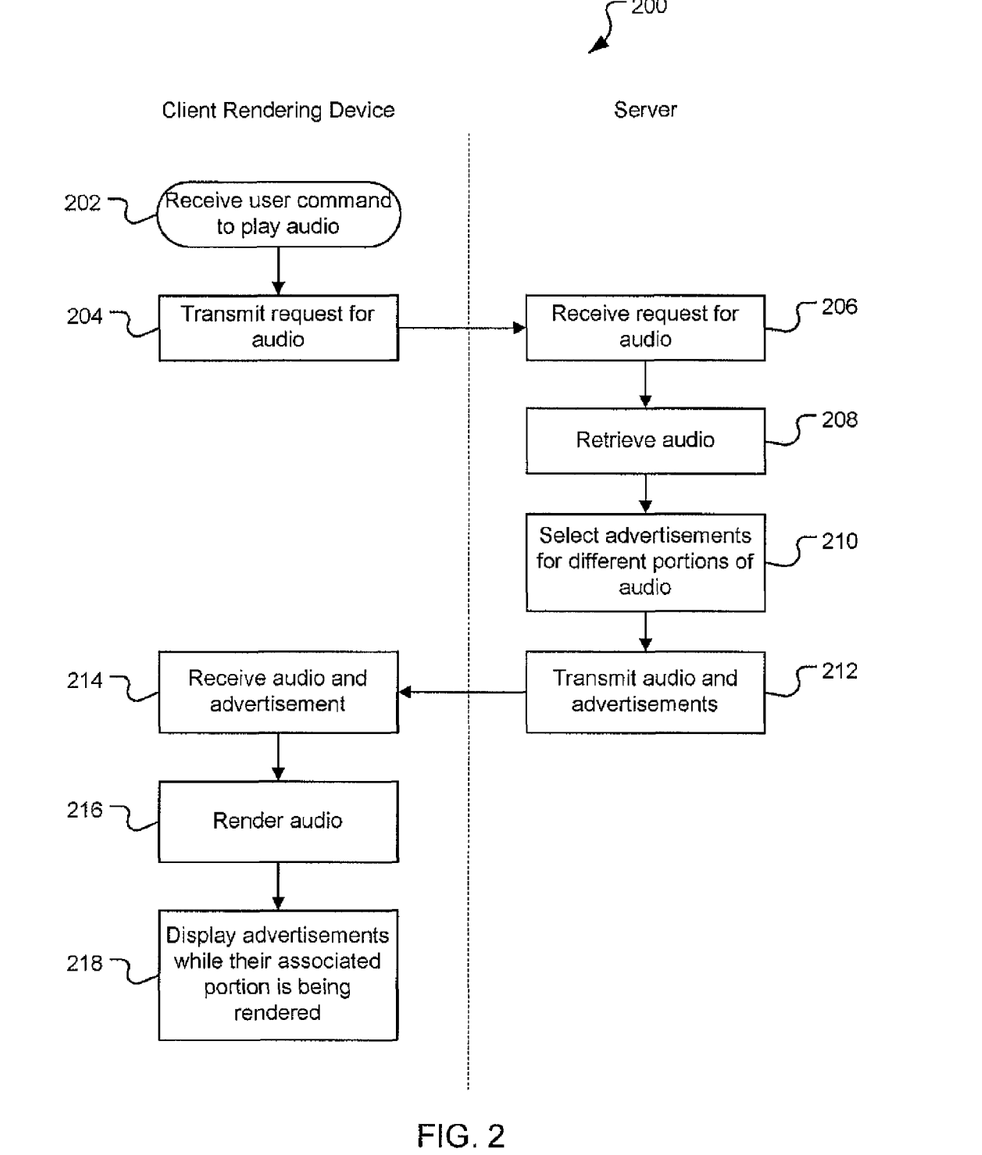
FIG. 2 illustrates an embodiment of a method for displaying contextually relevant advertisements.

FIG. 2 illustrates an embodiment of a method for displaying contextually relevant advertisements. In the embodiment shown, the method 200 is a client/server method and illustrates some of the actions performed or controlled by each device.

The method 200 starts with a command, such as a user command, to render a media object, which for the purposes of illustration is an audio file containing a song. The command is received by the client in a receive render command 202. The command may be received via the GUI of the client, such as by the GUI of a media player application running on the client. Alternatively, the command may be a command identifying a media object such as a click on a hyperlink or icon associated with the audio file that results in the execution of the media player to retrieve and render the file.

The client resolves the command and initiates the media player if necessary. In either case, a request is generated and transmitted for the audio file identified by the command.

In the embodiment shown, the audio file is on a remote media server and the request is received by the server in a receive request operation 206. The request may include an identification of the user associated with the client, such as a user ID, as well as information identifying the client to the server.

The media server retrieves the requested audio file in a retrieve operation 208. This operation 208 may include accessing a remote media file database as described above, or retrieving the media file from a cache, local memory or a local data source such as a hard disk or CD.

The server then selects one or more advertisements contextually related to different portions of the audio in an advertisement selection operation 210. This may include accessing any of the information data sources and databases as described above to generate a set of one or more keywords that are associated with different portions of the audio file. Using these keywords, the method 200 then selects at least one advertisement for each portion of the audio file.

The advertisements and the audio file are transmitted to the client in a transmit operation 212. The advertisements and the audio file may be transmitted together in a combined communication or the advertisements and the audio file may be transmitted independently. For example, the various advertisements may be independently transmitted in a "just-in-time" manner just before the moment that they are to be displayed to the user (i.e., just before the beginning of the portions of the audio file to which they were selected for). In this embodiment, the client will then display each advertisement when it is received and need not include the logic for determining when to the display each one.

The advertisements and the audio file are received by the client in a receive audio and advertisement operation 214. As discussed above, this may include receiving a combined communication containing the advertisements and the audio file or may include receiving multiple separate and independent communications each containing different data.

The audio is then rendered, either after all the audio file has been received or in a streaming fashion as the audio data is received, in a render operation 216. During the render operation, a display advertisement operation 218 displays the selected advertisements as their associated portions of audio are being rendered.

In this way, the contextually relevant advertisements are displayed to the user concurrently with their associated portion or media. It should be noted that as the advertisements are displayed on the media player's or rendering device's control GUI, there is no need to provide an intermediary such as a browser or webpage. Thus, the advertisements are displayed directly by the rendering device with interaction only with the media server or the advertisement server depending on the architecture.

Figure 3:
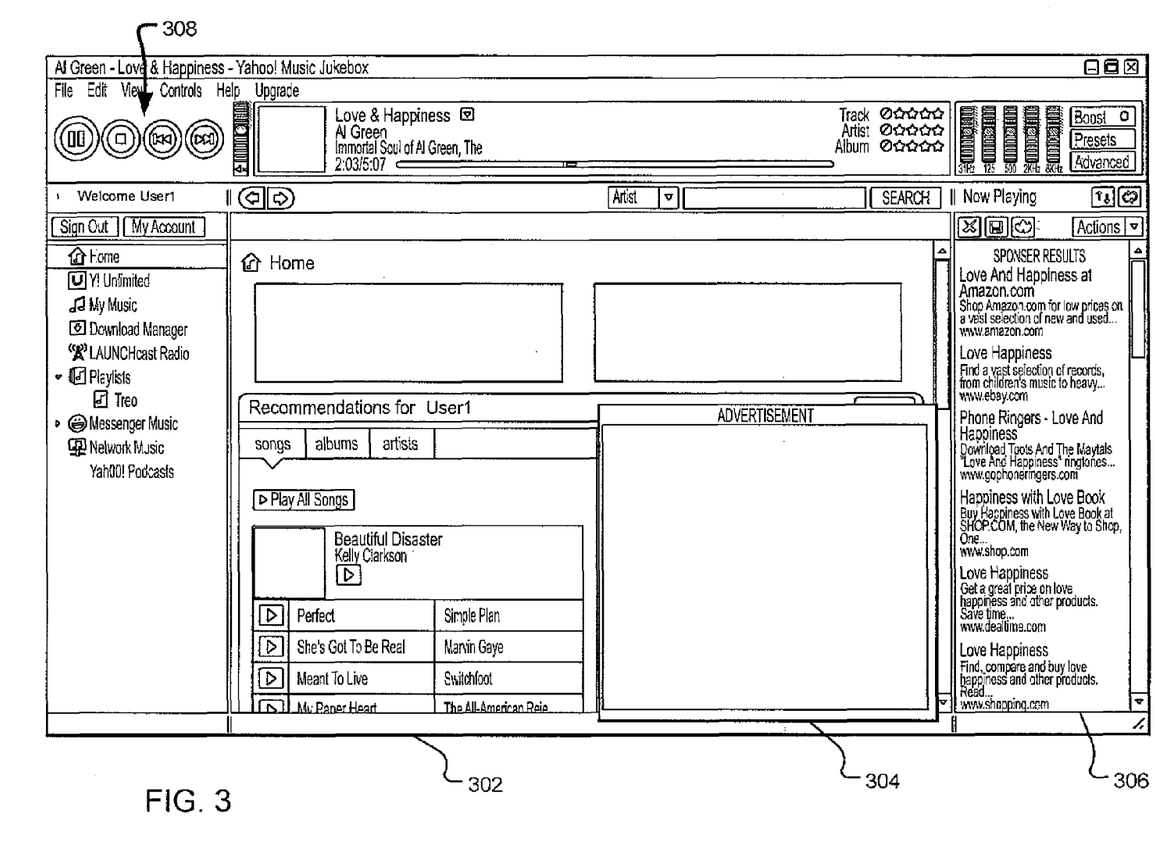
FIG. 3 illustrates an embodiment of a graphical user interface for a rendering device.

FIG. 3 illustrates an embodiment of a GUI for a rendering device. In the embodiment shown, the GUI 302 is for the YAHOO! MUSIC JUKEBOX media player, as it would be displayed on a computing device executing the media player software. The GUI 302 includes a set of controls 308 that control the rendering of media by the rendering device. In addition, several navigation trees and menus are provided for searching for, selecting and accessing various media objects.

In addition, the GUI 302 includes a first area 306, titled "Sponsor Results" that displays advertisements to the user. Thus, the media player application is adapted to retrieve and display advertisements to the user in this area 306. The sponsor results area 306 may display certain types of advertisements such as text based advertisements as shown.

Advertisements may also be shown in one or more other areas, such as an advertisement area 304. The advertisement area 304 may be a "pop-up" window created by the media player in that it appears when needed and is drawn so that it appears to cover portions of the GUI 302. Alternatively, the advertisement area 304 may be a pre-existing area of the GUI 302 that is re-rendered to include an advertisement as it is received or when one should be displayed.

In the embodiment shown, to the left, the YAHOO! MUSIC JUKEBOX GUI 302 is depicted with a currently playing song "Love & Happiness"—when the song's lyrics talk about a beach a graphic ad for a travel destination, selected as a result of the keyword "beach," is displayed in the ad window 304. At the same time, relevant text ads for the song are shown in the window 306 to the right. These advertisements refresh as new lyrics and metadata play throughout the duration of the song.

Figure 4:
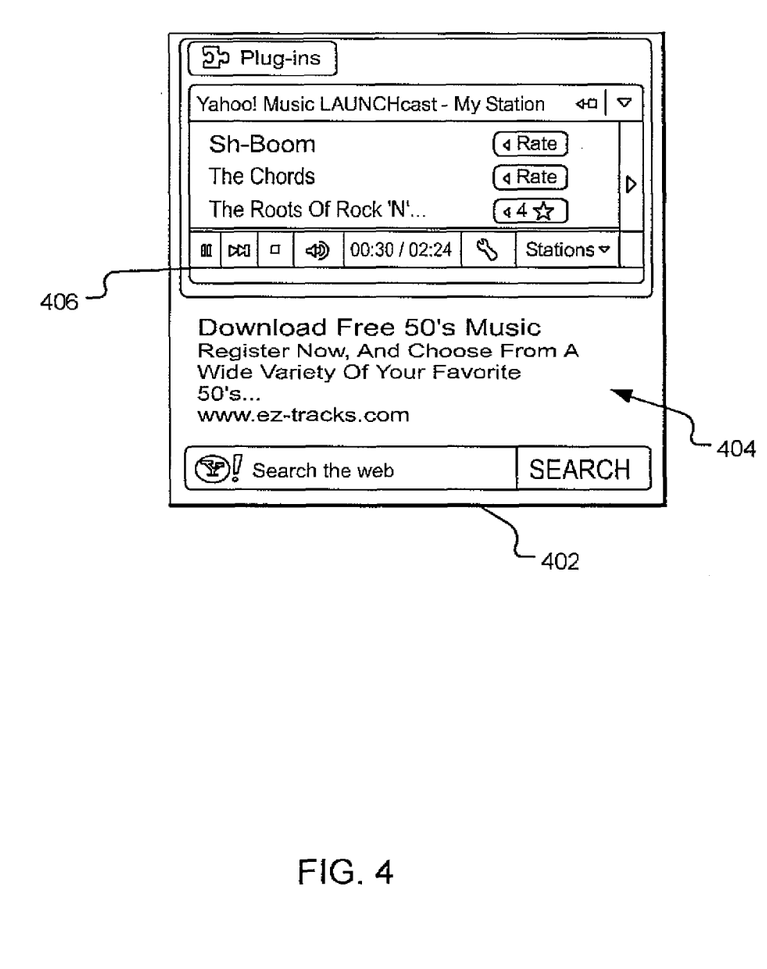
FIG. 4 illustrates yet another embodiment of a graphical user interface for a rendering device.

FIG. 4 illustrates yet another embodiment of a GUI for a rendering device. In the embodiment shown, the GUI 402 is a GUI for the control of a virtual tuner through which a user may search for and play virtual radio stations accessible over the Internet. From the GUI 402, the user may select a virtual radio station. The stream of audio data is then transmitted to the rendering device and the audio is rendered to the user as the stream is received.

As illustrated by the control panel 406, the rendering device is 30 seconds into rendering the 2 minute-24 second long song "Sh-Boom." Through the control panel 406, the user may rate the quality of the song as well as perform other actions related to the media being rendered.

In addition, the GUI 402 includes an area 404 that is displaying an advertisement for a music download service. As described above, the download service advertisement was selected based on the contextual information known about the song being played and user associated with the rendering device. When not rendering media, the area 404 may be used to display search information, such as to provide a description of a virtual radio station.

Figure 5:
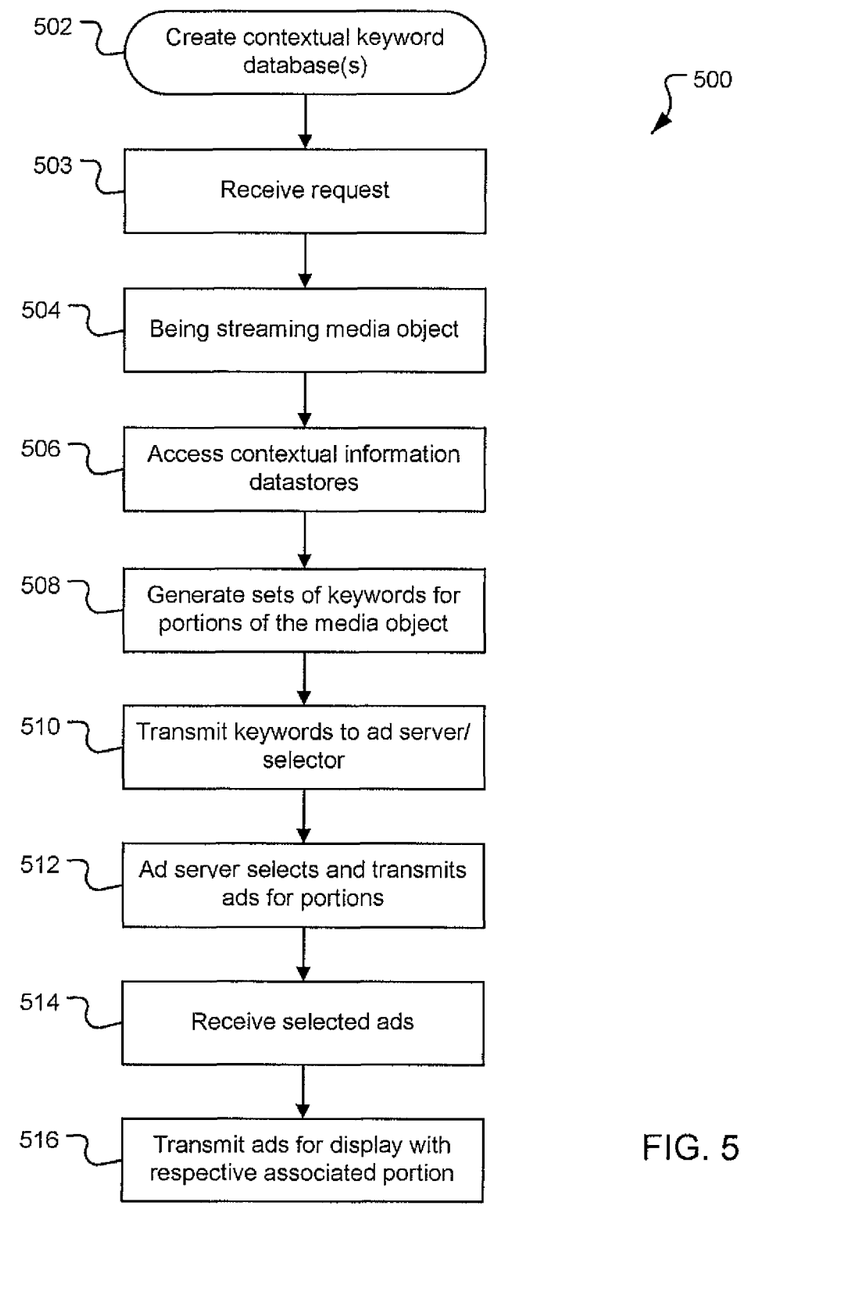
FIG. 5 illustrates an embodiment of a method for displaying contextually-related advertisements on a rendering device.

FIG. 5 illustrates an embodiment of a method for displaying contextually-related advertisements on a rendering device. The method 500 illustrates various operations that may be performed by a media server or may be distributed between several devices including the rendering device, an advertisement server or system, and a media server or system.

The method 500 includes creating one or more contextual information databases or other data repositories through which the context of a particular point or portion within a media object may be determined. In an embodiment, contextual information databases may be created as a companion set to a media object library (such as the media file database 140 in FIG. 1), so that contextual information from different sources is available for all media objects in the media object library. The contextual information databases, such as a metadata database 130, a lyric database 132, and a time tag database 134 described with reference to FIG. 1, may be combined into a single database and may even be combined into the media object database.

In an embodiment, the one or more contextual information databases are built which match all media object related contextual information to their associated media object and to parts within that object. Such databases collect data which relates to an object and stores the information in a manner which can be accessed. The database or databases may match lyrics, captions or sub-titles to moment in the playback of a media object. In an embodiment, the metadata may include keywords or other descriptive information for every second of a media object. Alternatively, a different granularity may be used such as every 2 second, 5 seconds or 10 seconds. In addition, metadata may be identified that describes the entire media object as well.

The metadata stored allows for keywords that are associated with any particular portion within a media object to be obtained. For example, in an embodiment each contextual information database may be mined for relevant phrases and keywords. For a video, a contextual information database may contain closed captions (if available), time tags, user generated tags, and any other metadata which can be used to generate relevant phrases and keywords.

From the information in the contextual information databases, keywords are provided that may be used to select advertisements from an advertisement selection system and/or database of advertisements. The database of advertisements is developed so that each advertisement is associated with different contextual information, such as keywords. The contextual information for advertisements may be provided by the advertisers in order to focus the delivery of the advertisements to target audiences. As the system will charge advertisers, such as on a per view basis, there is incentive for the advertisers to select the most effective contextual information to describe their advertisements.

After the various contextual information has been collected into a usable form, the system then waits for users requests for media objects in the media object library. In the embodiment shown, a user request is received in a receive request operation 503. The operation 503 may include receiving a request from a media player on a computing device, such as in response to a user command received through the GUI of the device, or may include receiving an automated command to transmit a media object to a particular device (such as a command to stream the next identified media object in a list of objects thus creating the impression that the user is listening to a virtual radio station). The request may identify the user, the rendering device, and the media object requested. More or less information may be included such as what GUI is being displayed to the user, thereby alerting the system to what advertisements may be appropriate for display on the GUI (e.g., provide text only advertisements for display on a small GUI such as that shown in FIG. 4).

After receiving the request, the method 500 retrieves the identified media object and transmits it to the rendering device for rendering. The rendering device then renders it immediately upon receipt or, alternatively, may store (e.g., buffer) it for later rendering. If stored, the rendering device may also store any contextually-related advertisements so that the advertisements are displayed at the appropriate time. Such capabilities may not be necessary if the media object is being streamed, as the method could stream the media object and transmit the advertisements at the appropriate intervals so that the rendering device need only display advertisements immediate upon receipt.

The method 500 also accesses the contextual information known about the media object and the requesting device and user in an access contextual information operation 506. This operation 506 includes accessing any appropriate contextual information databases or other data sources and may include accessing remote data stores.

From the information accessed, the method 500 generates one or more sets of keywords in a generate keyword sets operation 508. In an embodiment, the generate operation 508 generates a set of one or more keywords for each portion within a media object. The operation 508 may include generating a set of keywords for all the portions of the requested media object at one time. Alternatively, the method 500 could be repeated for each portion so that the keywords for a particular portion are generated only when needed. The keywords could be simply retrieved from the contextual information data or could be generated based on an analysis of such data.

The generate keywords operation 508 may also include defining the portions of the media object. In an embodiment, portions may be predetermined as being specific temporal segments such as the first 20 seconds, the second 20 seconds, the third 20 seconds and so on. Alternatively, the portions of a particular media object may be previously defined, such as by the system administrator or the media object author. Alternatively, the portions may be defined variably based on an analysis of the contextual information.

The sets of keywords are then transmitted to an advertisement selection system in a transmit keywords operation 510. This may take the form of a single request for multiple advertisements and provide all of the keywords for the different portions of the media object. Alternatively, a separate advertisement request may be made for each portion as the advertisement is needed. Regardless, the advertisement selection system receives the set or sets of keywords, selects one or more advertisements as necessary to fulfill the request and returns the advertisements (or links to the advertisements) in a select and transmit advertisement operation 512.

The selected advertisement or advertisements are received or otherwise retrieved using the information from the select and transmit operation 512 in a receive advertisements operation 514. The advertisements are then transmitted to the rendering device in a transmit advertisements) operation 516. As described above, the advertisements may be transmitted separately or as a group. If transmitted as a group, the advertisements may be cached by the rendering device and the transmission may include information identifying when each advertisement is to be displayed. The transmission may include packaging the advertisements with the media object so that a single transmission is made to the rendering device in response to the request. Alternatively, some or each of the advertisements may be transmitted to the rendering device as a completely separate and independent communication directed at the rendering device.

Advertisements transmitted by the method 500 are also tracked in the transmit advertisement operation 516 for billing purposes. The tracking of delivery of advertisements allows the operators to bill the advertisers and thereby receive payment for the media delivery service. Such advertisement tracking is well known in the art and any suitable method or system for collecting this information and performing the billing functions may be used.

In one example of operation, the method 500 allows a user to select a track to play (or a video to play), or select a radio station to play (or a video channel). The method 500 then retrieves a track to play. The contextual information associated with that track for each specific portion of the track is analyzed, keywords are generated and the advertisement database is searched for relevant ads. As the lyrics and metadata keywords in the song play through the audio source, the relevant text ads are displayed on the screen in an ad window, or in the messenger ad window.

Portions of the media object may be defined so that some advertisements actually precede the occurrence of their related contextual information. For example, when the singer is about to sing "broken heart" a Yahoo! Personals appears, stays on the screen through the phrase and chorus, and then in replaced by a Ford ad just before the singer sings "Get in my car and go". For a video, systems may also match relevant ads to the audio part of the video stream. In addition, the systems may also match relevant ads to the visuals in the video stream.

As described above, a rendering device for use with the systems and methods described above need not be a personal computer. In an embodiment, the user may be viewing or listening to the song on a portable device, such as an iPod or a mobile phone. The rendering device may be a purpose built device for interfacing only with the media server or may be a computing device that is provided with the appropriate software.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present disclosure. For example, selection of keywords could be done hierarchically by preferentially generating keywords from one or more databases first (e.g., the user demographic database). If a suitable number of keywords or a suitable advertisement for those keywords can not be found, then the lyric database may be accessed to generate another set of keywords. Such an iterative process could be continued based on an order of preference until an advertisement is selected and returned. Likewise, alternative embodiments of methods and systems described herein are also possible in which some or all of the operations are performed in a different order or distributed between different devices than those described above. Numerous other changes may be made which will readily suggest themselves to those skilled in the art and which are encompassed in the spirit of the disclosure and as defined in the appended claims.

What is claimed is:

1. A computing device, comprising:
   a graphical user interface comprising a first display area to enable a user to provide a request, the request to identify a portion of a media object;
   the graphical user interface further comprising a second display area to display search results at least in part in response to the user providing the request, said search results based at least in part on a search of a media object library, the second display area further to identify at least a portion of the media object stored in the media object library and metadata associated with the at least the portion of the media object, wherein the metadata is stored in a contextual metadata database associated with the media object library; and
   the graphical user interface further comprising a third display area to display at least a portion of the media object and an advertisement, the advertisement to be displayed based at least in part on a comparison between advertisement information stored in an advertisement database and the metadata stored in the contextual metadata database.

2. The computing device of claim 1, wherein the graphical user interface comprises a fourth display area to display the advertisement.

3. The computing device of claim 2, wherein the fourth display area is separate from the third display area.

4. The computing device of claim 3, wherein the fourth display area overlaps at least a portion of or is contained within the third display area.

5. The computing device of claim 2, wherein the fourth display area comprises a pop-up window.

6. The computing device of claim 2, the fourth display pop-up window are to disappear at least in part in response to completing display of the advertisement.

7. The computing device of claim 1, further comprising:
   a fifth display area to display the metadata associated with the portion of the media object to be displayed in the third display area.

8. The computing device of claim 1, the metadata associated with the media object to be displayed within the third display area while the third display area displays the portion of the media object.

9. The computing device of claim 1, further comprising:
a sixth display area to display the advertisement information associated with the advertisement to be displayed in the third display area.

10. The computing device of claim 1, the advertisement information associated with the advertisement to be displayed within the third display area while the third display area displays the portion of the media object.

11. The computing device of claim 1, further comprising:
a seventh display area comprising a virtual tuner through which a user may search for and play virtual media objects over a network, said virtual tuner correlated to the second display area.

12. The computing device of claim 1, further comprising:
an eighth display area comprising a control panel to enable a user to rate the quality of the media to be displayed in the third display area.

13. An article, comprising: a computer readable medium having stored thereon instructions executable by a computing platform to:
render a first display area of a graphical user interface to enable a user to provide a request, the request to identify a portion of a media object;
store a contextual metadata database associated with a media object library;
render a second display area of the graphical user interface to display search results at least in part in response to the user providing the request, said search results based at least in part on a search of the media object library, the second display area further to display at least a portion of the media object stored in the media object library and metadata associated with the at least the portion of the media object, wherein the metadata is stored in the contextual metadata database associated with the media object library; and
render a third display area of the graphical user interface to display at least a portion of the media object and an advertisement, the advertisement to be displayed based at least in part on a comparison between advertisement information stored in an advertisement database and the metadata stored in the contextual metadata database.

14. The article of claim 13, wherein the computer readable medium has stored thereon further instructions executable by the computing platform to render a fourth display area of the graphical user interface to display the advertisement.

15. The article of claim 14, wherein the fourth display area is separate from the third display area.

16. The article of claim 14, wherein the fourth display area overlaps at least a portion of or is contained within the third display area.

17. The article of claim 14, wherein the fourth display area comprises a pop-up window.

18. The article of claim 14, wherein the computer readable medium has stored thereon further instructions executable by the computing platform to cause the fourth display pop-up window to disappear at least in part in response to completing display of the advertisement.

19. The article of claim 13, wherein the computer readable medium has stored thereon further instructions executable by the computing platform to render a fifth display area of the graphical user interface to display the metadata associated with the portion of the media object to be displayed in the third display area.

20. The article of claim 13, the metadata associated with the media object to be displayed within the third display area while the third display area displays the portion of the media object.

21. The article of claim 13, wherein the computer readable medium has stored thereon further instructions executable by the computing platform to render a sixth display area of the graphical user interface to display the advertisement information associated with the advertisement to be displayed in the third display area.

22. The article of claim 13, the advertisement information associated with the advertisement to be displayed within the third display area while the third display area displays the portion of the media object.

23. The article of claim 13, wherein the computer readable medium has stored thereon further instructions executable by the computing platform to render a seventh display area of the graphical user interface comprising a virtual tuner through which a user may search for and play virtual media objects over a network, said virtual tuner correlated to the second display area.

24. The article of claim 13, wherein the computer readable medium has stored thereon further instructions executable by the computing platform to render an eighth display area of the graphical user interface comprising a control panel to enable a user to rate the quality of the media to be displayed in the third display area.

25. A method, comprising:
generating a first display area of a graphical user interface of a computing platform to enable a user to provide a request, the request to identify a portion of a media object;
storing a contextual metadata database associated with a media object library;
generating a second display area of the graphical user interface to display search results at least in part in response to the user providing the request, said search results based at least in part on a search of the media object library, the second display area further to display at least a portion of the media object stored in the media object library and metadata associated with the at least the portion of the media object, wherein the metadata is stored in the contextual metadata database associated with the media object library; and
generating a third display area of the graphical user interface to display at least a portion of the media object and an advertisement, the advertisement to be displayed based at least in part on a comparison between advertisement information stored in an advertisement database and the metadata stored in the contextual metadata database.

26. The method of claim 25, further comprising generating a fourth display area of the graphical user interface to display the advertisement.

27. The method of claim 26, wherein the fourth display area is separate from the third display area.

28. The method of claim 27, wherein the fourth display area overlaps at least a portion of or is contained within the third display area.

29. The method of claim 26, wherein the fourth display area comprises a pop-up window.

30. The method of claim 26, further comprising cause the fourth display pop-up window to disappear at least in part in response to completing display of the advertisement.

31. The method of claim 25, further comprising generating a fifth display area of the graphical user interface to display the metadata associated with the portion of the media object to be displayed in the third display area.

* * * * *